(12) United States Patent
Zones

(10) Patent No.: US 9,359,217 B2
(45) Date of Patent: Jun. 7, 2016

(54) MOLECULAR SIEVE SSZ-85 COMPOSITION OF MATTER AND SYNTHESIS THEREOF

(71) Applicant: Stacey Ian Zones, San Francisco, CA (US)

(72) Inventor: Stacey Ian Zones, San Francisco, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 433 days.

(21) Appl. No.: 14/095,083

(22) Filed: Dec. 3, 2013

(65) Prior Publication Data

US 2014/0227171 A1 Aug. 14, 2014

Related U.S. Application Data

(60) Provisional application No. 61/762,589, filed on Feb. 8, 2013.

(51) Int. Cl.
 *C01B 39/54* (2006.01)
 *C01B 37/06* (2006.01)

(52) U.S. Cl.
 CPC ............... *C01B 39/54* (2013.01); *C01B 37/065* (2013.01)

(58) Field of Classification Search
 CPC ............................... C01B 37/065; C01B 39/54
 See application file for complete search history.

(56) References Cited

U.S. PATENT DOCUMENTS

| 4,567,029 A | 1/1986 | Wilson et al. |
| 4,853,197 A | 8/1989 | Wilson et al. |
| 5,374,411 A | 12/1994 | Davis et al. |
| 5,501,848 A | 3/1996 | Nakagawa |
| 5,514,362 A | 5/1996 | Miller |
| 5,879,655 A | 3/1999 | Miller et al. |
| 2006/0138025 A1 | 6/2006 | Zones et al. |
| 2014/0227171 A1* | 8/2014 | Zones ............... C01B 39/54 423/707 |

FOREIGN PATENT DOCUMENTS

FR 2964962 3/2012

OTHER PUBLICATIONS

E.R. Cooper, C.D. Andrews, P.S.Wheatley, P.B. Webb, P. Wormald and R.E. Morris "Ionic Liquids and Eutectic Mixtures as Solvent and Template in Synthesis of Zeolite Analogues" Nature 2004, 430, 1012-1016.
E.R. Cooper, C.D. Andrews, P.S.Wheatley, P.B. Webb, P. Wormald and R.E. Morris "A New Methodology for Zeolite Analogue Synthesis Using Ionic Liquids as Solvent and Template" Stud. Surf. Sci. Catal. 2005, 158.247-254.
E.R. Parnham and R.E. Morris "The Ionothermal Synthesis of Cobalt Aluminophosphate Zeolite Frameworks" J. Am. Chem. Soc. 2006, 128, 2204-2205.
E.R. Parnham and R.E. Morris "Ionothermal Synthesis of Zeolites, Metal-Organic Frameworks, and Inorganic-Organic Hybrids" Acc. Chem. Res. 2007, 40, 1005-1013.
L. Han, Y. Wang, C. Li, S. Zhang, X. Lu and M. Cao "Simple and Safe Synthesis of Microporous Aluminophosphate Molecular Sieves by Ionothermal Approach" AIChE J. 2008, 54, 280-288.

(Continued)

*Primary Examiner* — David M Brunsman
(74) *Attorney, Agent, or Firm* — Terrence M. Flaherty

(57) ABSTRACT

This disclosure is directed to a new cobalt aluminophosphate molecular sieve designated SSZ-85 and a method for preparing SSZ-85 using a 1,3-diisopropylimidazolium ionic liquid.

11 Claims, 3 Drawing Sheets

(56) References Cited

OTHER PUBLICATIONS

R.E. Morris "Ionothermal Synthesis-Ionic Liquids as Functional Solvents in the Preparation of Crystalline Materials" Chem. Commun. 2009, 2990-2998.

J. Li, J. Yu and R. Xu "Progress in Heteroatom-Containing Aluminophosphate Molecular Sieves" Proc. R. Soc. A 2012, 468, 1955-1967.

PCT International Search Report, PCT/US2013/072786, mailed Jul. 15, 2014.

S.I. Zones "Synthesis of pentasil zeolites from sodium silicate solutions in the presence of quaternary imidazole compounds" Zeolites, 1989, 9, 458-467.

F. Duan, J. Li, P. Chen, J. Yu and R. Xu "A low-cost route to the syntheses of microporous cobalt-substituted aluminophosphates by using the waste mother-liquor" Micropor. Mesopor. Mater. 2009, 126, 26-31.

S. Pai, B.L. Newalkar and N.V. Choudary "Synthesis and characterization of cobalt substituted aluminophosphate molecular sieve: Co-SSZ-51 under microwave-hydrothermal conditions" Micropor. Mesopor. Mater. 2006, 96, 135-140.

J. Yu, O. Terasaki, I.D. Williams, S. Quiv and R. Xu "Solvothermal synthesis and characterization of new aluminophosphate layers templated by imidazolium ions" Supramol. Sci. 1998, 5, 297-302.

* cited by examiner

MOLECULAR SIEVE SSZ-85 COMPOSITION OF MATTER AND SYNTHESIS THEREOF

FIELD

This disclosure relates generally to new cobalt aluminophosphate molecular sieve designated SSZ-85, a method for preparing SSZ-85 using a 1,3-diisopropylimidazolium ionic liquid, and uses for SSZ-85.

BACKGROUND

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves can contain novel internal pore architectures, providing enhanced selectivities in these processes.

Molecular sieves have been conventionally prepared by hydrothermal synthesis, wherein an aqueous reaction mixture containing a tetrahedral atom source(s), a mineralizer, and a structure directing agent is heated under autogenous pressure in an autoclave. More recently, it has been reported that molecular sieves can be prepared by ionothermal synthesis, wherein an ionic liquid is used as both the solvent and the structure directing agent ("SDA"), also known as a crystallization template (see, e.g., E. R. Cooper et al., *Nature* 2004, 430, 1012-16; and E. R. Parnham et al., *J. Am. Chem. Soc.* 2006, 128, 2204-2205). Ionic liquids are a class of compounds made up entirely of ions and are generally liquids at ambient and near ambient temperatures. Ionic liquids tend to be liquids over a very wide temperature range, with some having a liquid range of up to 300° C. or higher. Ionic liquids are generally non-volatile, with effectively no vapor pressure. Many are air and water stable, and can be good solvents for a wide variety of inorganic, organic, and polymeric materials.

Ionothermal synthesis of molecular sieves has several advantages over conventional hydrothermal synthesis. Safety concerns associated with operating under high pressures during hydrothermal synthesis are eliminated. Since most ionic liquids are generally non-volatile, with effectively no vapor pressure, no autogenous pressure is produced on heating thereby allowing molecular sieve synthesis to take place at high temperature while keeping the pressure at ambient levels. Moreover, the ionic liquid used in ionothermal synthesis can be recycled for further use.

SUMMARY

The present disclosure is directed to a family of crystalline cobalt aluminophosphate molecular sieves with unique properties, referred to herein as "molecular sieve SSZ-85" or simply "SSZ-85."

In one aspect, there is provided a cobalt aluminophosphate molecular sieve having, in its calcined form, the powder X-ray diffraction (XRD) lines of Table 3.

In another aspect, there is provided a method for preparing a cobalt aluminophosphate molecular sieve by contacting under crystallization conditions: (1) at least one source of cobalt; (2) at least one source of aluminum; (3) at least one source of phosphorus; (4) fluoride ions; and (5) a 1,3-diisopropylimidazolium ionic liquid.

In yet another aspect, there is provided a process for preparing a cobalt aluminophosphate molecular sieve having, in its calcined form, the X-ray diffraction lines of Table 3, by: (a) preparing a reaction mixture containing (1) at least one source of cobalt; (2) at least one source of aluminum; (3) at least one source of phosphorus; (4) fluoride ions; and (5) a 1,3-diisopropylimidazolium ionic liquid; and (b) maintaining the reaction mixture under conditions sufficient to form crystals of the molecular sieve.

In its as-synthesized form and on an anhydrous basis, SSZ-85 is represented by the following empirical formula:

$$pQ:aF:(Co_xAl_yP_z)O_2$$

wherein p is the number of moles of 1,3-diispropylimidazolium cation (Q) per mole of $(Co_xAl_yP_z)O_2$ and p has a value of from 0.001 to 1; wherein a is the number of moles of fluoride ion (F) per mole of $(Co_xAl_yP_z)O_2$ and a has a value of from 0 to 1, inclusive (0≤a≤1); wherein x, y, and z represent the mole fraction of Co, Al, and P, respectively, as tetrahedral units; and wherein x, y, and z are each a value greater than zero and less than one and the sum of x, y, and z is one.

DETAILED DESCRIPTION

Introduction

Figure 1:
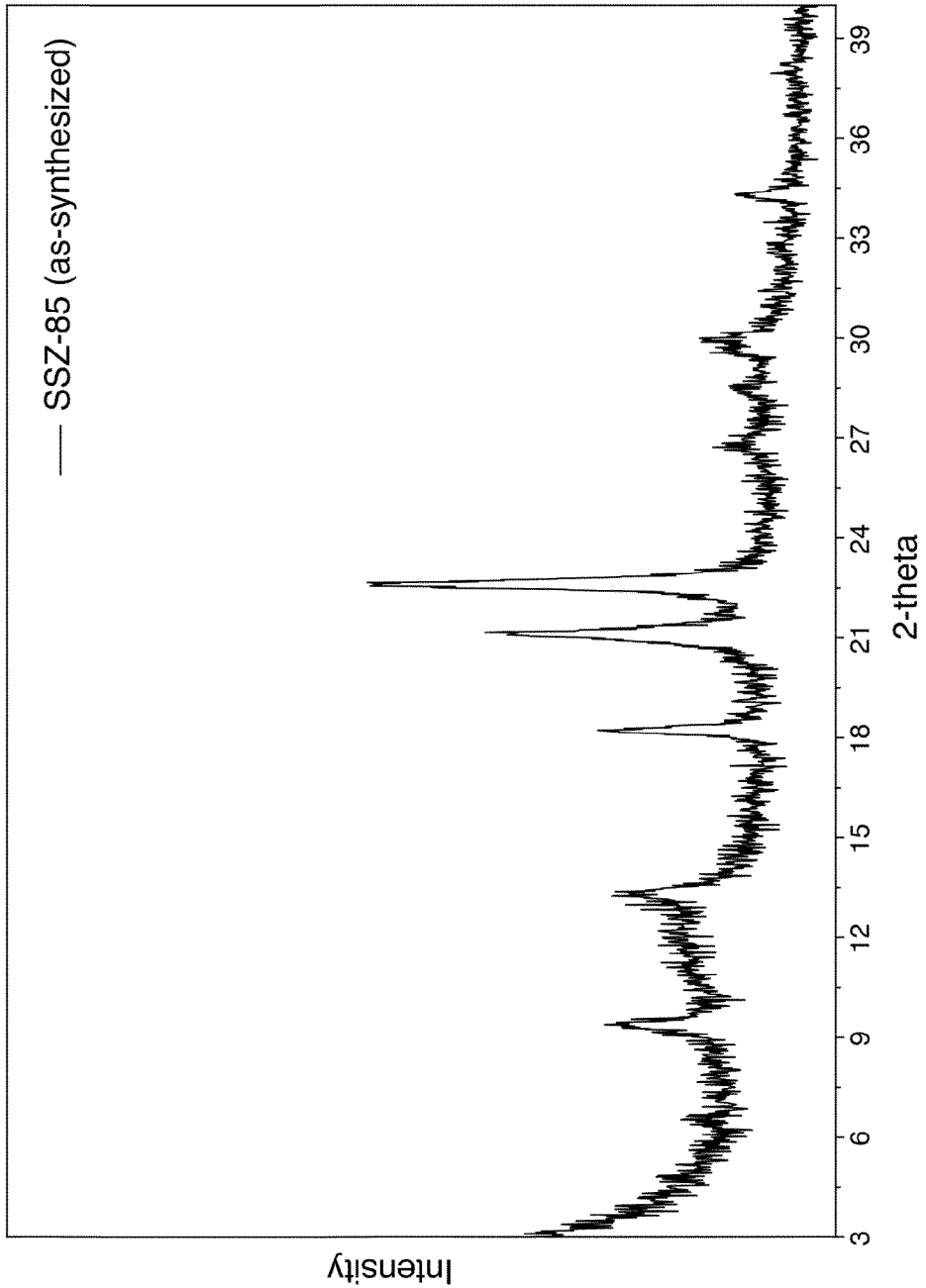
FIG. 1 is a powder XRD pattern of as-synthesized SSZ-85 prepared according to Example 1.

The following terms will be used throughout the specification and will have the following meanings unless otherwise indicated.

The term "active source" means a reagent or precursor capable of supplying at least one element in a form that can react and which can be incorporated into the molecular sieve structure. The terms "source" and "active source" can be used interchangeably herein.

The term "cobalt aluminophosphate molecular sieve" refers to a molecular sieve which has a three-dimensional microporous framework structure comprising $[CoO_2]$, $[AlO_2]$ and $[PO_2]$ tetrahedral units. Optionally, the cobalt aluminophosphate molecular sieve can also contain $[MO_2]$ tetrahedral units incorporated into the framework structure wherein M is a metal selected from the group consisting of silicon (Si), magnesium (Mg), manganese (Mn) iron (Fe), nickel (Ni), zinc (Zn), and mixtures thereof.

The term "ionic liquid" refers to liquids that are composed entirely of ions as a combination of cations and anions. The term "ionic liquid" includes low-temperature ionic liquids, which are generally organic salts with melting points under 100° C. and often even lower than room temperature.

SSZ-85 is prepared by ionothermal synthesis, wherein an ionic liquid is used as both the solvent and the structure directing agent ("SDA"), rather than via conventional hydrothermal synthesis. Imidazolium-based ionic liquids are among the most commonly used ionic liquids. A 1,3-diisopropylimidazolium ionic liquid is used for the ionothermal synthesis of SSZ-85 and is represented by the following structure (1):

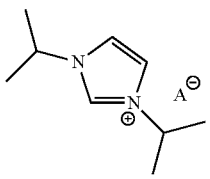
(1)

wherein A⁻ is any anionic counterion that is not detrimental to the formation of the molecular sieve. Representative anions include halogen (e.g., fluoride, chloride, bromide, iodide), hydroxide, acetate, sulfate, tetrafluoroborate, carboxylate, and the like.

Reaction Mixture

In general, molecular sieve SSZ-85 is prepared by: (a) preparing a reaction mixture containing: (1) at least one source of cobalt; (2) at least one source of aluminum; (3) at least one source of phosphorus; (4) fluoride ions; and (5) a 1,3-diisopropylimidazolium ionic liquid; and (b) maintaining the reaction mixture under conditions sufficient to form crystals of the molecular sieve.

The composition of the reaction mixture from which the molecular sieve is formed, in terms of mole ratios, is identified in Table 1 below:

TABLE 1

| Component | Broad | Exemplary |
|---|---|---|
| CoO/Al$_2$O$_3$ | 0.5 to 5 | 1 to 3 |
| P$_2$O$_5$/Al$_2$O$_3$ | 0.5 to 5 | 1 to 5 |
| Q/Al$_2$O$_3$ | ≥5 | 5 to 100 |
| F/Al$_2$O$_3$ | 0.5 to 3 | 0.5 to 1.5 | wherein Q is a 1,3-diisopropylimidazolium cation.

In embodiments, the Q/Al$_2$O$_3$ mole ratio is at least 5 (e.g., from 5 to 5000, from 5 to 1000, from 5 to 500, from 5 to 250, or from 5 to 100).

Suitable sources of cobalt (Co) include water-soluble cobalt salts, such as oxides, hydroxides, nitrates, sulfates, halides, and carboxylates.

Examples of suitable aluminum (Al) sources include hydrated aluminum oxides (e.g., boehmite, pseudoboehmite) and aluminum trialkoxides.

A suitable source of phosphorous (P) is phosphoric acid.

Examples of suitable sources of fluoride ions (F) include hydrogen fluoride and ammonium fluoride.

Optionally, the reaction mixture can contain a source of a second divalent metal (e.g., Mn and/or Zn). In these instances, it is anticipated that these metals will replace Al in the lattice so the amount of Al provided in the reaction mixture is reduced accordingly. Examples of suitable sources of divalent metal are the metal salts such as chloride, acetate, nitrate and sulfate salts.

Optionally, the reaction mixture can contain a source of silicon. Typically, Si will replace P in the lattice so the amount of P provided in the reaction mixture is reduced accordingly. Examples of suitable sources of silicon include fumed silica, precipitated silicates, silica hydrogel, silicic acid, colloidal silica, tetra-alkyl orthosilicates (e.g., tetraethyl orthosilicate), and silica hydroxides.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the synthesis conditions.

Crystallization and Post Synthesis Treatment

In practice, the molecular sieve is prepared by: (a) preparing a reaction mixture as described herein above; and (b) maintaining the reaction mixture under crystallization conditions sufficient to form crystals of the molecular sieve.

The reaction mixture is maintained at an elevated temperature until the crystals of the molecular sieve are formed. The crystallization is usually conducted in an autoclave at a temperature between 125° C. and 200° C. (e.g., from 150° C. to 200° C., or from 150° C. to 170° C.).

The reaction mixture can be subjected to mild stirring or agitation during the crystallization step. It will be understood by a person skilled in the art that the molecular sieve described herein can contain impurities, such as amorphous materials, unit cells having framework topologies which do not coincide with the molecular sieve, and/or other impurities (e.g., organic hydrocarbons).

During the crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added to the reaction mixture in an amount of at least 0.1 ppm (e.g., at least 10 ppm, at least 100 ppm, or at least 500 ppm), based on the total weight of the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

Optionally, the ionic liquid can be recovered from the reaction mixture using any of a variety of techniques (e.g., solvent extraction, decantation) for subsequent use.

The molecular sieve can be used as-synthesized, but typically will be thermally treated (calcined). The term "as-synthesized" refers to the molecular sieve in its form after crystallization, prior to removal of the SDA cation. The SDA cation can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA cation from the molecular sieve. The SDA cation can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more.

The molecular sieve made from the process described herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen.

In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

SSZ-85 is useful in catalysts for a variety of hydrocarbon conversion reactions such as hydrocracking, dewaxing, olefin isomerization, partial oxidation, and alkylation, transalkylation, or isomerization of aromatic compounds. SSZ-85 is also useful as an adsorbent for gas separations.

Characterization of the Molecular Sieve

In its as-synthesized form and on an anhydrous basis, SSZ-85 is represented by the following empirical formula:

$$pQ:aF:(Co_xAl_yP_z)O_2$$

wherein p is the number of moles of 1,3-diisopropylimidazolium cation (Q) per mole of $(Co_xAl_yP_z)O_2$ and p has a value of from 0.001 to 1; wherein a is the number of moles of fluoride ion (F) per mole of $(Co_xAl_yP_z)O_2$ and a has a value of from 0 to 1, inclusive ($0 \leq a \leq 1$); wherein x, y, and z represent the mole fraction of Co, Al, and P, respectively, as tetrahedral units; and wherein x, y, and z are each a value greater than zero and less than one and the sum of x, y, and z is one. In embodiments, p has a value of from 0.001 to 0.5, from 0.001 to 0.4, from 0.001 to 0.3, or from 0.001 to 0.2. In embodiments, a has a value of from 0.1 to 0.8, or from 0.2 to 0.6. In one embodiment, x is from 0.01 to 0.5, y is from 0.25 to 0.7, and z is from 0.25 to 0.7. In another embodiment, x is from 0.01 to 0.25, y is from 0.4 to 0.6, and z is from 0.4 to 0.6.

Molecular sieves made by the process described herein are characterized by their XRD pattern. The XRD pattern lines of Table 2 are representative of as-synthesized SSZ-85. Minor variations in the diffraction pattern can result from variations in the mole ratios of the framework species of the particular sample due to changes in the lattice constants. In addition, sufficiently small crystals will affect the shape and intensity of peaks, leading to significant peak broadening. Minor variations can also result from variations in the organic compound used in the preparation. Calcination can also cause minor shifts in the XRD pattern. Notwithstanding these minor perturbations, the basic crystal lattice remains unchanged.

TABLE 2

Characteristic Peaks for As-Synthesized SSZ-85

| 2-Theta[a] | d-Spacing, nm | Relative Intensity[b] |
|---|---|---|
| 9.38 | 0.9421 | M |
| 13.28 | 0.6661 | M |
| 18.22 | 0.4866 | S |
| 21.16 | 0.4196 | VS |
| 22.66 | 0.3921 | VS |
| 26.86 | 0.3317 | W |
| 28.42 | 0.3138 | W |
| 29.56 | 0.3020 | W |
| 30.00 | 0.2977 | W |
| 34.32 | 0.2611 | M |

[a]±0.20
[b]The X-ray patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The XRD pattern lines of Table 3 are representative of calcined SSZ-85.

TABLE 3

Characteristic Peaks for Calcined SSZ-85

| 2-Theta[a] | d-Spacing, nm | Relative Intensity[b] |
|---|---|---|
| 9.60 | 0.9208 | W |
| 13.62 | 0.6498 | VS |
| 18.66 | 0.4751 | VS |
| 20.34 | 0.4363 | W |
| 21.49 | 0.4133 | S |
| 23.14 | 0.3841 | VS |
| 27.29 | 0.3265 | W |
| 29.28 | 0.3047 | W |
| 30.42 | 0.2936 | M |
| 33.18 | 0.2698 | W |
| 35.01 | 0.2561 | W |

[a]±0.20
[b]The X-ray patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

EXAMPLES

The following illustrative examples are intended to be non-limiting.

Example 1

Synthesis of SSZ-85

SSZ-85 was prepared by combining in a Teflon cup 0.11 g of aluminum isopropoxide, with a solution of 0.20 g of concentrated phosphoric acid, 0.21 g of cobalt (II) acetate tetrahydrate, 2 g of 1,3-diisopropylimidazolium bromide, and finally 0.02 g of concentrated hydrofluoric acid. The resulting mixture was stirred into a paste then heated in a 23 mL Parr reactor at autogenous pressure for 3 days at 160° C. with 43 rpm tumbling.

The solid reaction product was recovered by filtration, washed with water and dried in air at ambient temperature.

Energy Dispersive X-ray (EDX) analysis of the sample in a Scanning Electron Microscope (SEM) confirmed that cobalt was in the product.

Elemental analysis of the product obtained gave the following results: 8.59 wt. % Al, 11.5 wt. % P, 6.76 wt. % Co and 2.44 wt. % F.

The resulting powder XRD pattern of the as-synthesized product is shown in FIG. 1.

Example 2

Calcination of SSZ-85

Figure 2:
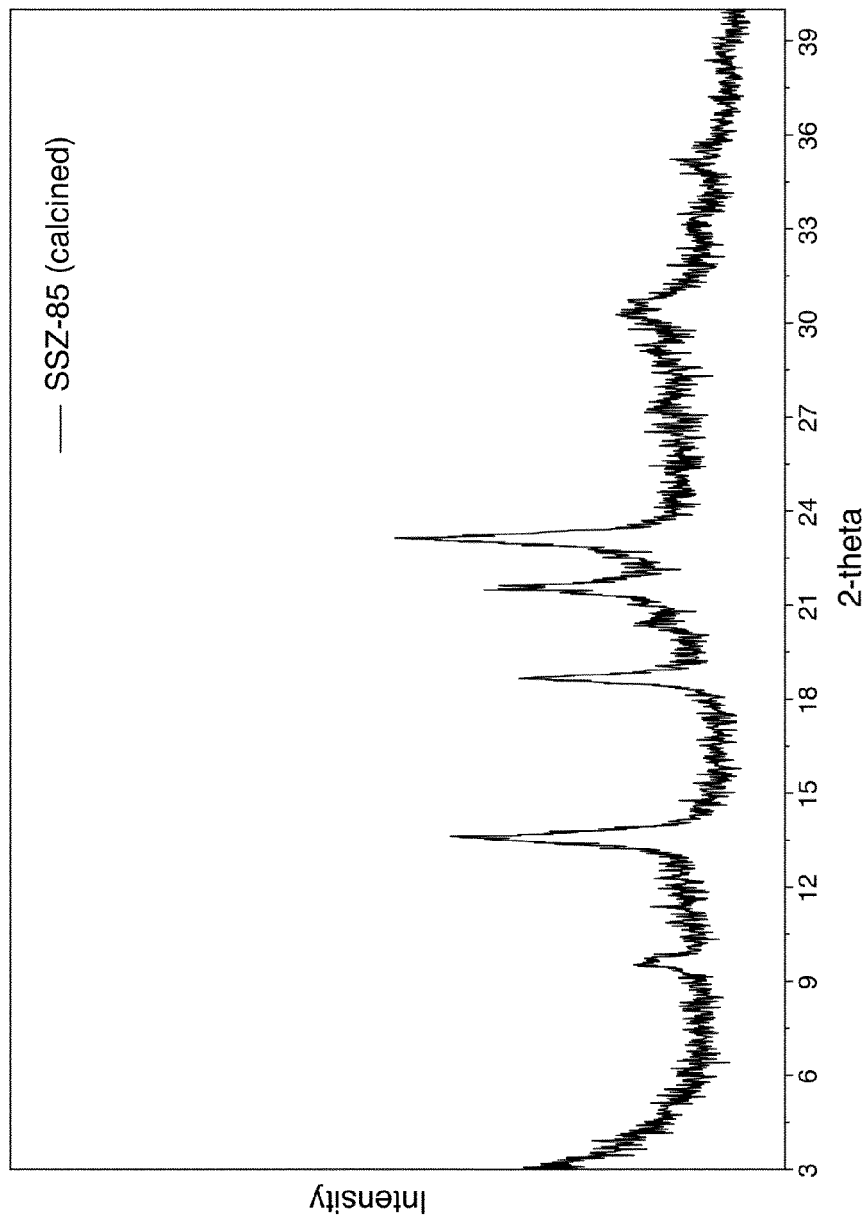
FIG. 2 is a powder XRD pattern of calcined SSZ-85 prepared according Example 2.

The product from Example 1 was calcined inside a muffle furnace under a flow of 2% oxygen/98% nitrogen heated to 595° C. at a rate of 1° C./min and held at 595° C. for five hours, cooled and then analyzed by powder XRD. The resulting powder XRD pattern of the calcined product is shown in FIG. 2. The XRD pattern indicates that the material remains stable after calcination to remove the organic SDA.

Example 3

Nitrogen Adsorption (Micropore Volume Analysis)

Calcined SSZ-85 of Example 2 was subjected to a surface area and micropore volume analysis using $N_2$ as adsorbate and via the BET method. A t-plot analysis of nitrogen physisorption data of the calcined product of Example 2 indicated a micropore volume of 0.902 $cm^3/g$ and an external BET surface area of 255.97 $m^2/g$.

Example 4

Constraint Index Determination

The calcined SSZ-85 of Example 2 was pelletized at 4-5 kpsi and crushed and meshed to 20-40. 0.50 g was packed into a ⅜ inch stainless steel tube with aluminum on both sides of the zeolite bed. A Lindburg furnace was used to heat the reactor tube. Helium was introduced into the reactor tube at 10 mL/min and at atmospheric pressure. The reactor was heated to about 700° F. (371° C.) and a 50/50 (w/w) feed of n-hexane and 3-methylpentane was introduced into the reactor at a rate of 8 μL/min. Feed delivery was made via a Brownlee pump. Direct sampling into a gas chromatograph began after 10 minutes of feed introduction. The Constraint Index value (not including 2-methylpentane) was calculated from the gas chromatographic data using methods known in the art, and was found to be between 0.33 and 0.35 for times on stream from 10 to 100 minutes. At 700° F. (371° C.) and 10 minutes on-stream, feed conversion was about 7%. After 100 minutes on stream, the conversion was about 5.5%.

Example 5

Hydrocarbon Uptake

Figure 3:
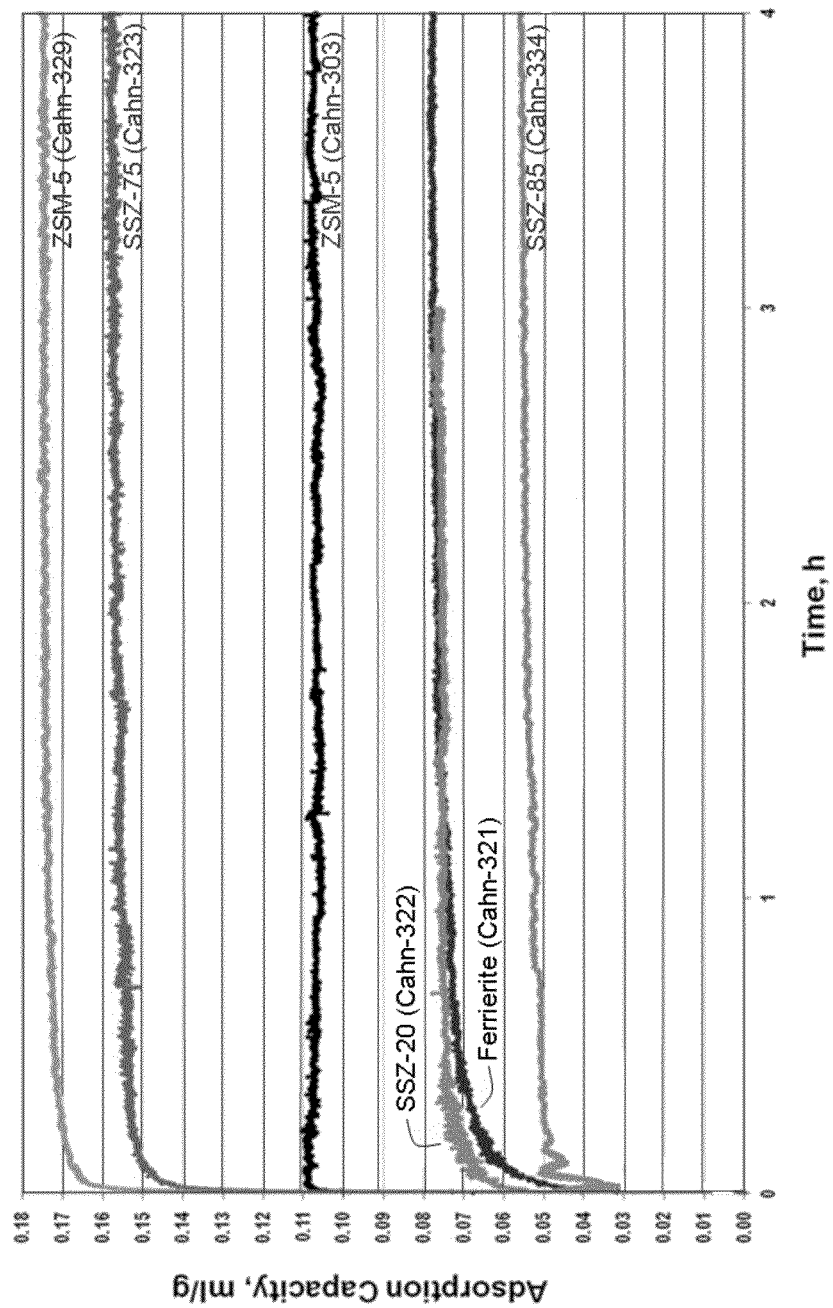
FIG. 3 shows the adsorption of n-hexane in SSZ-85 and several other molecular sieves.

The adsorption capacity for vapor phase n-hexane of the calcined SSZ-85 of Example 2 was measured as described by Chen et al., *Microporous Mesoporous Mater.* 2007, 104, 39-45. FIG. 3 shows the adsorption of n-hexane in SSZ-85 and various other molecular sieves. SSZ-85 was shown to have an adsorption capacity for n-hexane of about 0.05 mL/g after about 30 minutes of exposure to the n-hexane adsorbate and of about 0.055 mL/g after about 90 minutes of exposure to the adsorbate.

Examples 6-9

The synthesis of SSZ-85 was repeated as described in Example 1 except that the mole ratios of cobalt were changed in the preparation. No other adjustments to the reagents were made. The results are set forth in Table 4 and demonstrate that not all ratios are successful in making SSZ-85.

TABLE 4

| Example | Co Relative to Example 1 | Product |
|---|---|---|
| 6 | 0 | Quartz Phase |
| 7 | 0.25 | Unknown |
| 8 | 0.5 | SSZ-85/Unknown |
| 9 | 2 | SSZ-85 |

Examples 10-13

A series of temperatures were studied for the synthesis of SSZ-85. In each case, the reaction was prepared as described in Example 1 and run for 3 days with 43 rpm tumbling of each run. The results are set forth in Table 5.

TABLE 5

| Example | Reaction Temperature | Product |
|---|---|---|
| 10 | 140° C. | Weak pattern for SSZ-85 |
| 11 | 150° C. | SSZ-85 |
| 12 | 160° C. | SSZ-85 |
| 13 | 170° C. | SSZ-85 |

Example 14

Elemental analysis for the 1,3-diisopropylimidazolium cation was determined for the product of Example 1. The total hydrocarbon pore-filling was found to be about 14%. The C/N ratio in the product was 4.42 while the starting template has a C/N ratio of 4.50, indicating good correlation.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims. To an extent not inconsistent herewith, all citations referred to herein are hereby incorporated by reference.

The invention claimed is:

1. A crystalline cobalt aluminophosphate molecular sieve having, in its calcined form, an X-ray diffraction pattern substantially as shown in the following Table:

| 2-Theta | d-spacing, nm | Relative Intensity |
|---|---|---|
| 9.60 ± 0.20 | 0.9208 | W |
| 13.62 ± 0.20 | 0.6498 | VS |
| 18.66 ± 0.20 | 0.4751 | VS |
| 20.34 ± 0.20 | 0.4363 | W |
| 21.49 ± 0.20 | 0.4133 | S |
| 23.14 ± 0.20 | 0.3841 | VS |
| 27.29 ± 0.20 | 0.3265 | W |
| 29.28 ± 0.20 | 0.3047 | W |
| 30.42 ± 0.20 | 0.2936 | M |
| 33.18 ± 0.20 | 0.2698 | W |
| 35.01 ± 0.20 | 0.2561 | W. |

2. A crystalline cobalt aluminophosphate molecular sieve having, in its as-synthesized form, an X-ray diffraction pattern substantially as shown in the following Table:

| 2-Theta | d-spacing, nm | Relative Intensity |
|---|---|---|
| 9.38 ± 0.20 | 0.9421 | M |
| 13.28 ± 0.20 | 0.6661 | M |
| 18.22 ± 0.20 | 0.4866 | S |
| 21.16 ± 0.20 | 0.4196 | VS |
| 22.66 ± 0.20 | 0.3921 | VS |
| 26.86 ± 0.20 | 0.3317 | W |
| 28.42 ± 0.20 | 0.3138 | W |
| 29.56 ± 0.20 | 0.3020 | W |
| 30.00 ± 0.20 | 0.2977 | W |
| 34.32 ± 0.20 | 0.2611 | M. |

3. The molecular sieve of claim 2, having, on an anhydrous basis, a composition represented by the following empirical formula:

$$pQ:aF:(Co_xAl_yP_z)O_2$$

wherein:
(a) p is the number of moles of 1,3-diisopropylimidazolium cation (Q) per mole of $(Co_xAl_yP_z)O_2$ and p has a value from 0.001 to 1;
(b) a is the number of moles of fluoride ion (F) per mole of $(Co_xAl_yP_z)O_2$ and a has a value from 0 to 1;
(c) x, y, and z represent the mole fraction of Co, Al, and P, respectively, as tetrahedral units; and
(d) x, y, and z are each a value greater than zero and less than one and the sum of x, y, and z is one.

4. The molecular sieve of claim 3, wherein x is from 0.01 to 0.5, y is from 0.25 to 0.7, and z is from 0.25 to 0.7.

5. A method of preparing a crystalline cobalt aluminophosphate molecular sieve comprising contacting under crystallization conditions: (1) at least one source of cobalt; (2) at least one source of aluminum; (3) at least one source of phosphorus; (4) fluoride ions; and (5) a 1,3-diisopropylimidazolium ionic liquid.

6. The method of claim 5, wherein the molecular sieve is prepared from a reaction mixture comprising, in terms of mole ratios, as follows:

| | |
|---|---|
| $CoO/Al_2O_3$ | 0.5 to 5 |
| $P_2O_5/Al_2O_3$ | 0.5 to 5 |
| $Q/Al_2O_3$ | ≥5 |
| $F/Al_2O_3$ | 0.5 to 3 | wherein Q is a 1,3-diisopropylimidazolium cation.

7. The method of claim 5, wherein the molecular sieve is prepared from a reaction mixture comprising, in terms of mole ratios, as follows:

| | |
|---|---|
| $CoO/Al_2O_3$ | 1 to 3 |
| $P_2O_5/Al_2O_3$ | 1 to 5 |
| $Q/Al_2O_3$ | 5 to 100 |
| $F/Al_2O_3$ | 0.5 to 1.5 | wherein Q is a 1,3-diisopropylimidazolium cation.

8. The method of claim 5, wherein the molecular sieve has, in its calcined form, an X-ray diffraction pattern substantially as shown in the following Table:

| 2-Theta | d-spacing, nm | Relative Intensity |
|---|---|---|
| 9.60 ± 0.20 | 0.9208 | W |
| 13.62 ± 0.20 | 0.6498 | VS |
| 18.66 ± 0.20 | 0.4751 | VS |
| 20.34 ± 0.20 | 0.4363 | W |
| 21.49 ± 0.20 | 0.4133 | S |
| 23.14 ± 0.20 | 0.3841 | VS |
| 27.29 ± 0.20 | 0.3265 | W |
| 29.28 ± 0.20 | 0.3047 | W |
| 30.42 ± 0.20 | 0.2936 | M |
| 33.18 ± 0.20 | 0.2698 | W |
| 35.01 ± 0.20 | 0.2561 | W. |

9. The method of claim 5, wherein the crystallization conditions include a temperature of from 150° C. to 200° C.

10. The method of claim 5, wherein the 1,3-diisopropylimidazolium ionic liquid is 1,3-diisopropylimidazolium bromide.

11. The method of claim 5, further comprising recovering the ionic liquid from the reaction mixture.

* * * * *